United States Patent

[11] 3,590,369

| [72] | Inventor | Charles T. Wainwright<br>Stevenage, England |
|---|---|---|
| [21] | Appl. No. | 799,351 |
| [22] | Filed | Feb. 14, 1969 |
| [45] | Patented | June 29, 1971 |
| [73] | Assignee | British Aircraft Corporation Limited<br>London, England |

[54] SWITCHING MEANS FOR AUTOMATIC TESTING EQUIPMENT
3 Claims, 1 Drawing Fig.

[52] U.S. Cl. .................................................. 324/51,
324/73 AT
[51] Int. Cl. ............................................... G01r 31/02
[50] Field of Search ......................................... 324/51, 52,
73; 317/148.5; 307/305

[56] References Cited
UNITED STATES PATENTS
3,246,240  4/1966  Arnold ......................... 324/51X Primary Examiner—Michael J. Lynch
Attorney—Kemon, Palmer and Estabrook ABSTRACT: An automatic testing equipment includes a matrix having two groups of conductors. Energization of any pair of conductors, one in each group, from a pair of binary signal decoding heads is effective to energize a circuit for closing a particular relay associated with the crossing point of the energized conductors, there being a plurality of such relays, one for each test to be performed. The equipment includes a scanning means for scanning the two groups of conductors of the matrix to produce an error signal in the event that more than one conductor of either group is energized at the same time. An inhibit circuit for the relays is energized by such error signal.

PATENTED JUN29 1971 3,590,369
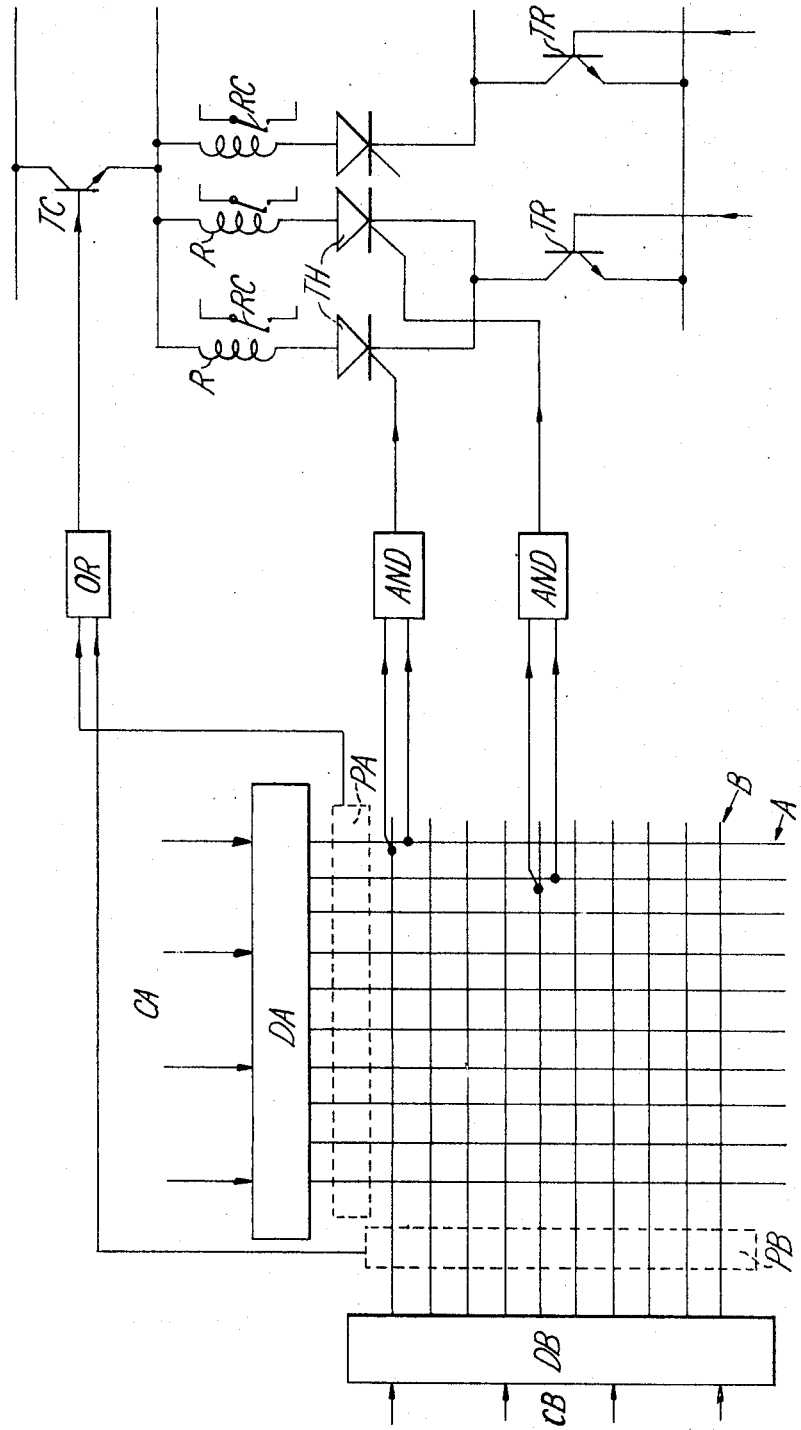
Inventor
Charles T. Wainwright
By
Kenyon, Palmer & Estabrook
Attorneys

SWITCHING MEANS FOR AUTOMATIC TESTING EQUIPMENT

Automatic testing equipment has been designed which is capable of being connected to a number of test points in an apparatus to be tested and which, in use, is supplied with a record strip constituting a test program. The test program carries information representing a sequence of tests including, for each test, data identifying the test point to which a test signal is to be applied and the numerical values of the test signal and of the limits within which the response from the test point must fall. Thus, for each test specified on the program, a circuit to the defined test point must be closed and this is usually accomplished by closing a relay contact. The selection of one out of the large number of relays which are required to connect up the test points, is usually effected by further contacts which may, for example, take the form of a contact "tree" in which each contact line branches into further lines, each containing a contact, until the final relay circuits are reached. It is an object of the present invention to avoid the requirement for closing a number of contacts in order to define the relay to be energized and in this way to reduce errors due to contact resistance and to reduce maintenance necessitated by contact wear.

According to the present invention, there is a relay for each test point having a contact for closing a circuit to the test point and a test point selector, responsive to a program specifying a number of test points to which test signals are to be applied in sequence, includes a number of groups of conductive paths, each test point being defined by a unique combination of conductive paths from different groups, means responsive to the output of the reading means for energizing one conductive path in each group of such paths, a coincidence detector for each test point connected to the conductive paths which define that test point, and a controlled rectifier for each test point for energizing the relay upon operation of the coincidence detector. In this way, the relay selecting contacts are eliminated but the final contact in the test point circuit is retained, this being desirable to avoid the noise which would result from the use of a semiconductor switch. In the preferred form of apparatus, the controlled rectifiers are turned off by a series transistor which is normally conducting, but which can be rendered nonconducting by the application of a biasing potential to its base. This transistor can, if desired, be common to a number of controlled rectifiers and can thus turn several off simultaneously if, for example, several relays are used in connection with a single test point; for example, a first relay, for connecting a test signal to the test point, a second relay for connecting a response from the test point to a verifying circuit and perhaps a third relay in a self-checking circuit.

Such an arrangement has a further advantage in relation to fault detection and the prevention of over loading. Each group of lines in the selector can be scanned electronically as each selection is made to give a fault output if more than one line is energized. This fault output may take the form of a signal which is used to bias off a transistor in series with and common to all the controlled rectifiers. Because the scanning and the biasing of the transistor with the consequent cessation of current flow through the controlled rectifier can take place before the relay contact has had time to make, the discovery of a fault of this nature arrests the operation of the machine without the closure of the various contacts associated with the energized lines and the damage which would be caused by the simultaneous closure of these contacts. If the scanning reveals no fault, the selected contact closes in the usual way and the test is carried out. Thus, for each test point selection the "matrix" is checked for faults without stopping or hindering the operation of the machine.

If desired, the checking of each group of lines in the matrix can be a simple parity check, that is to say a check which would reveal the existence of an even number of energized lines. The simultaneous energization of more than two lines is unlikely.

The invention is illustrated in the accompanying drawing which shows a matrix having a group of vertical lines A, and a group of horizontal lines B.

These lines are energized by the outputs of decoders DA and DB which receive binary signals on the four parallel lines CA and CB respectively. For each combination of signals on lines CA, the decoder DA energizes a single one of the matrix lines A and in a similar manner for each combination of binary digits on the parallel lines CB, the decoder DB energizes a single one of the lines B. The lines A are of course not connected to the lines B at their "cross-points" but instead at each cross-point a connection is taken from each line to an "AND" gate which applies an output signal to the gate electrode of a thyristor TH when both its input lines are energized. The drawing shows connections from only two of the cross-points. The triggering of a thyristor TH energizes a relay coil R in series with it and closes the relay contact RC in the test point circuit.

Each of the transistors TR turns off the thyristors in series with it when a biasing potential is applied to the transistor base at the end of a given test.

The drawing also shows the parity check scanners PA and PB each of which applies a signal to an OR gate if more than one energized line is discovered in the group which it scans. The OR gate applies a signal to the base of a transistor TC which is common to all the thyristors connected to this matrix. This signal stops conduction in the transistor and in any triggered thyristor and thus prevents closure of the relay contact.

In the example described, two groups A and B, each of ten matrix lines, are used to define the test points. It will be clear that for larger numbers of test points it may be advantageous to use three or even more groups of lines and to have a correspondingly increased number of connections to each coincidence circuit.

I claim:
1. Automatic testing equipment comprising:
 means for reading a program specifying a number of test points to which test signals are to be applied in sequence;
 a relay for each test point having a contact for closing a circuit to the test point;
 a test point selector including a number of groups of conductive paths, each unique combination of conductive paths from different groups defining a different test point, means responsive to the output of the reading means for energizing one conductive path in each group of such paths, a coincidence detector for each test point, connected to the conductive paths which define that test point, and a controlled rectifier for each test point for energizing the relay upon operation of the coincidence detector to close the said contact of the relay and thereby to complete the circuit to the selected test point, as determined by the reading means, for the application of a test signal to the selected test point;
 checking means for scanning each group of conductive paths in the selector when a selection is made and providing a fault indication when more than one conductive path in a single group is energized in a single selection;
 and switching means responsive to the checking means for preventing the relays from energizing when the checking means provides the said fault indication, the checking means and switching means having a total operating time which is less than the total operating time of any of the said controlled rectifiers and its associated relay.

2. Automatic testing equipment in accordance with claim 1, in which the switching means includes a common transistor in series with a plurality of the said controlled rectifiers, and a gate circuit responsive to the checking means to switch the transistor from a conducting condition to a nonconductive condition when the checking means indicates that more than one conductive path in a single group is energized in a single selection.

3. Automatic testing equipment in accordance with claim 5, in which the checking means for each group of conductive paths is in the form of a parity checker connected to indicate a fault if there is an even number of energized conductive paths in the group.